United States Patent Office 2,978,166
Patented Apr. 4, 1961

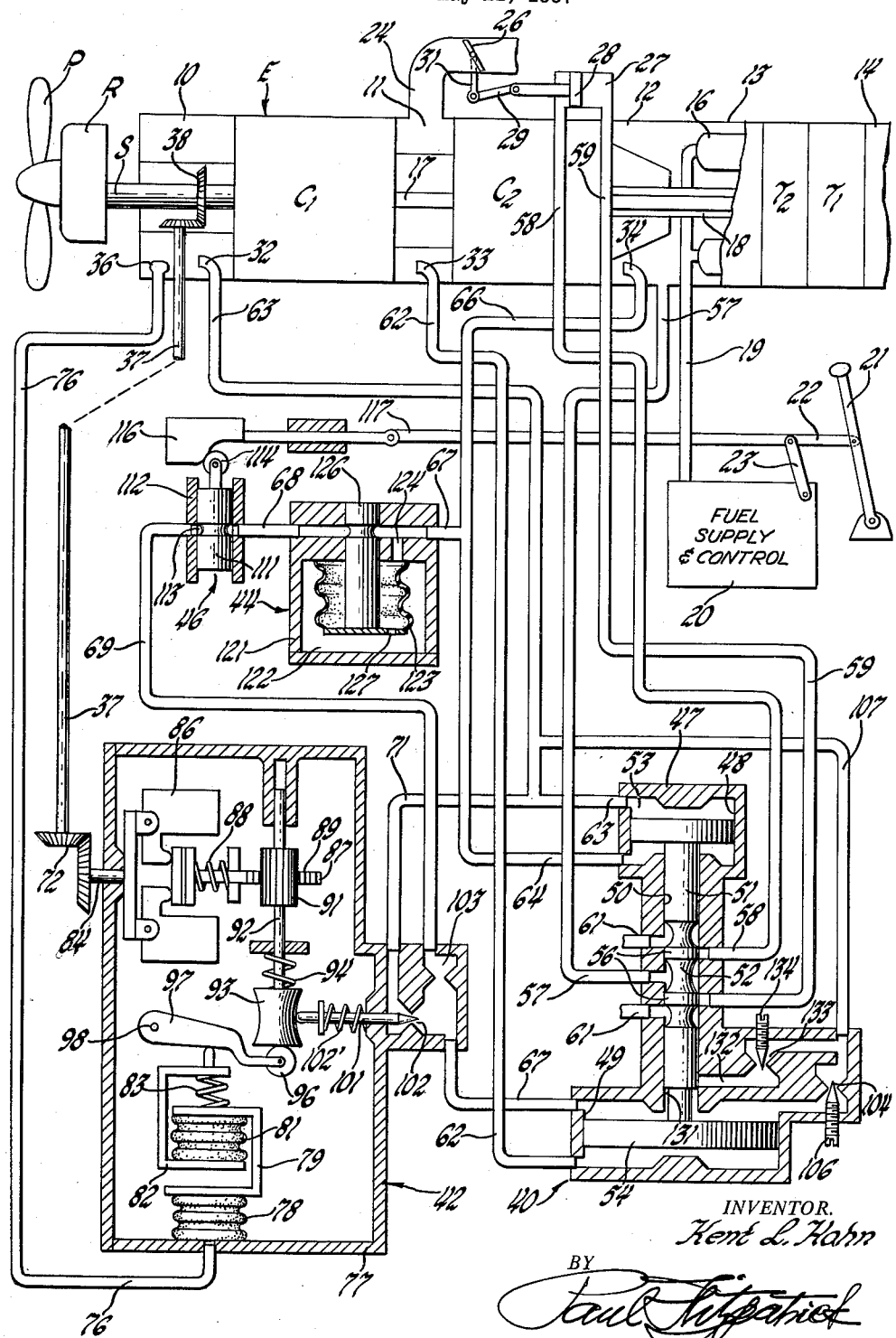

2,978,166

COMPRESSOR BLEED CONTROL

Kent L. Hahn, Speedway, Ind., assignor to General Motors Corporation, Detroit, Mich., a corporation of Delaware Filed May 28, 1957, Ser. No. 660,496

21 Claims. (Cl. 230—115)

My invention relates to controls for gas turbine engines and particularly to a compressor bleed control for an interstage bleed of the engine compressors. The control is provided to open the bleed under conditions of engine operation which would result in surge of the low pressure compressor stages if the bleeds were not opened. The invention is particularly adapted to engines of the type commonly referred to as two-spool engines in which the compressor comprises two independently rotating compressors driven by separate turbines.

The principal objects of the invention are to improve the safety and economy of such engines and particularly to operate a bleed control for such engines in such a way as to prevent compressor surge but without providing an unnecessary margin between the surge point and the point at which the bleed valve is opened.

The nature of the invention and the advantages thereof will be clearly apparent to those skilled in the art from the succeeding detailed description of the preferred embodiment of the invention and the accompanying drawing, which is a schematic diagram of the control associated with a two-spool turboprop aircraft engine.

Referring to Figure 1, the engine is shown schematically since the details of its structure are immaterial. The turbine engine E drives a speed governing propeller P through a power output shaft S and a reduction gear R. The engine E comprises an air inlet housing 10, a low pressure compressor C1, a transition housing 11, a high pressure compressor C2, a midframe 12, a combustion apparatus 13, a high pressure turbine T2, a low pressure turbine T1, and an exhaust duct 14, in that order from the front to rear of the engine. Air enters the engine through the inlet 10, is compressed in compressor C1, flows through transition section 11 into compressor C2, and flows through and is diffused in the midframe 12. The combustion section 13 includes combustion chambers 16 in which fuel is burned in the air discharged by the compressor. The resulting combustion products flow through turbines T2 and T1 in series. Turbine T1 is coupled to compressor C1 by an inner shaft 17 and turbine T2 to compressor C2 by an outer shaft 18. Fuel is supplied to the combustion chambers 16 by a fuel line 19 supplied by a fuel supply and control system 20. The power output level of the engine is controlled by a pilot's power control lever 21 coupled to the fuel control of mechanism 20 by link 22 and arm 23. It will be understood that the structure so far described is that of a known type of power plant to which the invention is applied and that the details thereof are immaterial to an understanding of my invention.

Under certain conditions of engine operation, surge of compressor C1 may be encountered. In general, this occurs when the low pressure rotor speed is high and the T2 turbine inlet temperature is low. Surge is prevented by bleeding air from the transition section 11 through a vent conduit 24 normally closed by a butterfly valve 26. The valve is opened and closed by a suitable power operator such as an air servo cylinder 27 mounted on the engine, the piston 28 of which is connected by a link 29 and arm 31 to the butterfly valve 26.

Proceeding now to the control mechanism which actuates cylinder 27, this control involves five sensing connections to the engine. Probes 32, 33 and 34 in the air inlet housing, transition section, and midframe, respectively, sense total pressure at these points. These pressures will be referred to hereafter as P1 at the air inlet, P2 between the compressors and P3 at the high pressure compressor outlet. A temperature bulb 36 senses temperature T1 of the air in the inlet. A shaft 37 coupled to the engine output shaft by gears 38 provides a sense of low pressure compressor speed N1. The bleed valve control system by which the servo cylinder 27 is energized comprises two principal elements, an actuator 40 and a speed and temperature control 42, and two auxiliary elements, an acceleration control 44 and a power lever control 46. The actuator includes a servo valve 50, 52 which directly controls the operation of servo cylinder 27. As will be apparent, cylinder 27 acts as a relay means controlled by the actuator 40. The actuator 40 alone or in combination with the cylinder 27 may be termed bleed valve control means. The speed and temperature control modifies the operation of the actuator in response to T1 and N1. The functions of the acceleration and power lever controls will be passed over for the present. The bleed valve actuator comprises a body 47 defining a bias piston cylinder 48 at one end, an actuator piston cylinder 49 at the other, and a servo valve cylinder 50 between the other cylinders. A reciprocating control member 51 comprises a valve spool 52 reciprocable in cylinder 50 fixed to bias piston 53 reciprocable in cylinder 48 and actuator piston 54 reciprocable in cylinder 49. Lands 56 on the reduced intermediate portion of valve spool 52 selectively connect an actuating pressure line 57 to lines 58 and 59 running to opposite ends of the servo cylinder 27. Line 58 energizes the cylinder to open the bleed valve 26 and line 59 to close the bleed valve. When either line 58 or 59 is connected to the pressure inlet 57, the other of these lines is connected to one of two vents 61. This is conventional servo valve structure. Line 57 may be supplied from any suitable source of actuating fluid under pressure and, as shown, is connected to the outlet of compressor C2. As will be apparent, if spool 52 moves upwardly from the neutral position shown, the bleed valve will be opened, and if spool 52 moves downwardly, valve 26 will be closed. The lower end of actuator piston cylinder 49 is connected through line 62 to the P2 pressure probe 33. The upper end of the bias piston cylinder is connected by line 63 to the P1 pressure probe 32. The lower end of the bias piston cylinder is connected by lines 64 and 66 to the P3 pressure probe 34. The upper end of actuator piston cylinder 49 is connected by a line 67 to the speed and temperature control 42 which transmits a variable controlling pressure, hereafter referred to as PC, through line 67.

The P3 pressure probe is also connected through lines 66 and 67, acceleration control valve 44, line 68, power lever valve 46, and line 69 to the speed and temperature control 42. For the present, we may assume that valves 44 and 46 are fully open so that P3 is supplied through line 69 to the speed and temperature control. Control 42 is also connected to the P1 probe 32 through line 63 and branch line 71. The control 42 receives the N1 rotor speed input through shaft 37 and gearing 72, and a T1 input from temperature bulb 36 through line 76.

The speed and temperature control 42 comprises a case 77 in which is mounted a temperature responsive bellows 78 connected to sensing bulb 36. Bellows 78 is connected through a bracket 79 with a compensating bellows 81 which moves a bracket 82 in opposition to compression spring 83. Bellows 81 serves to compensate the temperature input for local temperature variations in the control which might otherwise disturb the output of bellows 78. The speed input through gears 72 drives the shaft 84 of a flyball device 86 which actuates a slidably mounted output shaft 87 in opposition to the force of a spring 88. Shaft 87 is provided with rack teeth 89 cooperating with an elongated pinion 91 on a slidably and rotatably mounted cam shaft 92. A three-dimensional cam 93 mounted on the shaft 92 is biased down, as shown, by compression spring 94 and biased upward by a roller 96 on an arm 97 pivoted in the case at 98. Arm 97 is engaged by the bracket 82, which provides a T1 input. The cam is rotated by the speed sensing device 86 acting through rack and pinion 89, 91. Cam 93 controls the position of a valve needle 101, one end of which engages the cam and is biased against the cam by a spring 102'. As will be apparent, therefore, the position of valve needle 101 is a function of T1 and N1.

Valve needle 101 controls an orifice 102 between P1 line 71 and control pressure line 67. A fixed orifice 103 controls fluid flow from the P3 line 69 to control line 67. The control pressure is also affected by a normally fixed orifice 104, the area of which may be adjusted by a needle valve member 106 threaded into the case 47. This orifice allows air to flow from the control pressure chamber of cylinder 49 into a line 107 connected to the P1 probe 32. Adjustable needle 106 provides an adjustment for the actuating point of the bleed valve 26.

The pressure ratio across orifices 102 and 104 is critical and therefore the flow through these depends only upon the value of the control pressure PC in line 67 and the areas of the orifice. Since orifice 102 is the only orifice automatically variable in operation and it is controlled by T1 and N1, control pressure PC is determined by P3, T1 and N1.

The bleed control system is based upon the principle that, if ram pressure ratio in the engine inlet is assumed constant, measurement of N1 and T1 makes it possible to compute a minimum ratio of P3 to P2 which must be maintained to avoid surge of the low pressure compressor if the bleed valves are closed. The reason is that decrease of P3 over P2 increases P2 over P1 to cause surge. The change in P2 over P1 is too small for satisfactory use for control purposes. The effect of ram may be neglected without serious effects, as it merely decreases to some extent the accuracy of the control, which means in practice that the control is scheduled to open the bleed valve whenever N1, T1, and the compressor pressures are such that C1 surge could occur at any value of ram pressure ratio.

The flow through fixed orifice 103 is determined by P3 and PC and the flow through set orifice 104 by PC. The flow through orifice 102 is determined by PC and the size of the orifice. The flow through 103 equals the sum of the flows through 104 and 102. Therefore, PC is determined by the value of P3 and the size of orifice 102, and thus by P3, T1 and N1.

Cam 93 is contoured so that the ratio of P3 to PC is slightly greater than the value of the P3 to P2 ratio which will cause C1 surge, and thus as P2 increases relative to P3 and approaches the danger point, it will become greater than PC and actuate the servo valve to open the bleed. We have neglected for the present the effect of the bias piston 53, which can be omitted. The mechanism so far described can constitute an effective control for the bleed valve 26.

The control is improved, however, by the bias piston which causes the control point of the servo valve to follow more closely the surge characteristic of the compressor and lessens the variation required in orifice 102 by the speed and temperature control. As will be apparent, the bias piston tends to open the bleed valve in response to P3 and to close it in response to P1. The greater the total pressure rise in the compressors, the greater the bias exerted upwardly by piston 53 on the servo valve.

The result is that PC can be higher as P3 increases and lower as P3 decreases. This provides a compensation paralleling, in general, the N1 and T1 compensation effected by cam 93. Thus, orifice 102 requires less variation. In some instances it may be possible (depending upon engine characteristics) to eliminate the temperature compensation of orifice 102, or even to eliminate all compensation and fix the size of orifice 102. Because of the bias piston, PC is higher than P2 and is high enough to maintain critical flow through 102 and 104.

The power lever control valve 46 is provided to open the bleed valve 26 at low speed and power operation of the engine. The reason for this is that at low engine speed and power levels, the compressor output pressures P2 and P3 are too low for accurate control of the bleed valve and, therefore, the bleed valve is held open to assure that surge does not occur. This is not a matter of importance, since the engine is seldom operated for any length of time at such low power levels. Valve 46 is a simple shut-off valve comprising a spool 111 slidable in a body 112. The spool has a groove 113 which normally registers with the valve body ports to permit flow through the valve. Spool 111 is under control of a cam follower 114 actuated by a reciprocable cam 116 coupled by a link 117 to the power control arm 23. Cam 116 is contoured to push valve spool 111 downwardly at all power level positions below a position predetermined in accordance with the characteristics of the engine. In a particular case, the valve 111 is closed when the power lever is below about the 15% power position. The valve 46, when it is closed, causes the bleed valve to open by cutting off P3 pressure from line 69. With P3 pressure cut off the pressure in control line 67 will drop to P1 and the P2 pressure on the lower face of actuator piston 54 will move the servo valve to open the bleed valve 26.

The acceleration control valve 44 is provided to cause the bleed valve control to respond in the desired manner to acceleration of the engine. Assuming the engine has been running in a steady state condition, the fuel supply is increased to accelerate or, in other words, increase the power output of the engine. It will be understood that the low pressure compressor and turbine may not accelerate, since they may be held to a constant speed by the propeller governor. If the propeller governor is reset to a higher speed as a part of a change to an increased power level, there will be some acceleration of the low pressure spool. The high pressure spool will accelerate in any case, but takes time to accelerate. Since the acceleration is accomplished by an increase in fuel supply, it results in a sudden increase in turbine inlet temperature. This causes a small increase in the pressure ratio of each compressor. The increase in the P2 over P1 ratio may be sufficient to cause surge, but since the actuator is so constructed that it opens the bleed valves when P3 over P2 decreases, the actuator would continue to hold the bleed valve closed. The bleed valve acceleration control causes the bleed valves to open during acceleration of the engine. This is accomplished by cutting off the supply of P3 pressure to the speed and temperature control whenever P3 is increasing faster than a predetermined rate.

This is accomplished by valve 44 which is sensitive to rate of pressure change. Valve 44 comprises a body 121 having a sealed chamber 122 within which is mounted a bellows 123. Bellows 123 is connected by a passage 124 to the P3 line 67. A valve spool 126 connected to the head of the bellows closes the connection between lines 67 and 68 when the bellows expands more than a predetermined amount. A small orifice 127 in the bellows connects the interior of the bellows with the chamber 122. Air entering through passage 124 acts to expand the bellows and close valve 44, provided the change is rapid enough to overcome the leakage through orifice 127. When the acceleration ceases and the P3 pressure stabilizes at the higher level, the air will leak out of the bellows through orifice 127 and valve 44 will be opened.

An additional feature of the control which should be mentioned is the reset control. A groove 131 is cut in the valve spool 52 adjacent actuator piston 54. When the piston moves upwardly to open the bleed valve 26, groove 131 connects the control pressure chamber to a vent 132 in which there is an orifice 133 adjustable by a threaded needle 134. The orifice 133 communicates with the P1 pressure line. The additional bleed through orifice 133 slightly reduces the control pressure and thereby causes the bleed valve to remain open until the P3 over P2 ratio has become slightly greater than that necessary to cause the bleed valve to open. This serves to prevent hunting of the bleed valve due to the fact that opening of the bleed reduces P2 and, therefore, would cause the actuator piston to move back and close the bleed if the reset were not provided.

*Operation*

While the operation of the system has been set out in connection with the description of the structure, a further brief description of the operation may be helpful. To begin with, the control operates to open bleed valve 26 in order to prevent surge of the first compressor C1. It does this in response to certain factors which indicate the approach of conditions which result in surge of the compressor and, therefore, that the bleed valve should be opened. The values or parameters which determine the operation of the bleed valve in normal operation of the engine are second compressor outlet pressure P3, first compressor outlet pressure P2, engine inlet temperature T1, and low pressure compressor speed N1. Pressure P2 is used directly to bias piston 54 of the actuator in a direction to open the bleed valve. Outlet pressure P3 also operates over the smaller area piston 53 to bias the actuator in a direction to open the bleed valve. P3, T1, and N1 are also supplied to the control mechanism 42 to generate a control pressure PC based upon the values of these parameters which operates on piston 54 in a direction to close the bleed valve.

The control pressure is that pressure which results from throttling P3 pressure through orifice 103 to PC pressure and from throttling PC pressure through fixed orifice 104 and speed and temperature controlled orifice 102 to a datum pressure, taken as compressor inlet pressure P1. Since the ratio of PC to P1 is above the critical ratio, the value of P1 does not affect the control pressure.

Orifice 102 is controlled by the three-dimensional cam 93 which determines the area of the orifice as a function of N1 and T1, based upon the characteristics of the particular engine, to maintain the control pressure at a value which will cause the bleed valve to open to forestall surge. The control pressure is maintained at a value depending upon the values of P3, T1, and N1 which is low enough that the P2 and P3 pressures working on movable actuator member 51 will overcome the control pressure and open the bleed valve at a point short of that at which compressor surge would begin.

The operation may be explained in other terms by stating that the control device 42 develops a control pressure which bears a ratio to P3 dependent upon the low pressure compressor speed and inlet temperature, the latter two being factors which influence the allowable pressure ratio of the low pressure compressor. The control responds directly to the pressure rise in the second compressor rather than that in the first because the pressure rise in the second compressor has a more pronounced variation and is a more sensitive indicator of conditions conducive to low pressure compressor surge.

The throttle position responsive valve 46 cuts off the supply of P3 to the control device at low throttle conditions and the acceleration responsive valve 44 similarly cuts off the supply of P3 during acceleration. As a result, the control pressure is reduced under either of these circumstances, allowing P2 to open the bleed valve.

The advantages of the invention in providing an effective, accurate, and sensitive control of the bleed valve to prevent surge in the low pressure compressor will be apparent. The structure is simple and the mechanism is of a trouble-free nature.

It will be apparent that many modifications may be made in the system while retaining the principles thereof and that certain features of the control may be eliminated where they are unnecessary because of the characteristics of a particular engine or because of tolerance of a lesser degree of accuracy of the control.

The detailed description of the preferred embodiment of the invention for the purposes of explaining the principles thereof are not to be considered as limiting the invention, as many modifications may be made by the exercise of skill in the art within the scope of the invention.

I claim:

1. A bleed control for a gas turbine engine of the type comprising a low pressure compressor, a high pressure compressor, air flow conducting means connecting the outlet of the low pressure compressor to the inlet of the high pressure compressor, an air bleed in communication with said means, and valve means in the air bleed operable to open and close the air bleed; the bleed control comprising, in combination, bleed valve control means connected to and operating the said valve means, the said bleed valve control means being movable and moving to control the valve means, means connected to the low pressure compressor outlet and the bleed valve control means biasing the bleed valve control means in one direction in response to low pressure compressor discharge pressure, and means operable to provide a control pressure connected to the valve control means so that the control pressure biases the valve control means in the other direction; the control pressure providing means including means connected to the high pressure compressor outlet providing air under a control pressure which is determined at least in part by high pressure compressor discharge pressure; movement of the bleed valve control means in the said one direction being effective to open the air bleed and movement thereof in the other direction being effective to close the air bleed.

2. A bleed control as recited in claim 1 including automatic means responsive to low pressure compressor speed for varying the said control pressure.

3. A bleed control as recited in claim 1 including automatic means rsponsive to low pressure compressor inlet temperature and low pressure compressor speed for varying the said control pressure.

4. A bleed control as recited in claim 1 including also pressure responsive means connected to the bleed valve control means urging the bleed valve control means in the said one direction and means connecting the said urging means to the high pressure compressor outlet and supplying high pressure compressor discharge pressure to the said urging means.

5. A bleed control as recited in claim 1 including a valve controlling the flow of air from the high pressure compressor outlet to the control pressure providing means and means operable to close said valve in response to a condition indicative of operation of the engine below a predetermined power level.

6. A bleed control as recited in claim 1 including a valve controlling the flow of air from the high pressure compressor outlet to the control pressure providing means and means operable to close said valve in response to a condition indicative of acceleration of the engine.

7. A bleed control for a gas turbine engine of the type comprising a low pressure compressor, a high pressure compressor, air flow conducting means connecting the outlet of the low pressure compressor to the inlet of the high pressure compressor, an air bleed in communication with said means, and valve means in the air bleed operable to open and close the air bleed; the bleed control comprising, in combination, bleed valve control means connected to and operating the said valve means, the said bleed valve control means being movable and moving to control the valve means, means connected to the low pressure compressor outlet and the bleed valve control means biasing the bleed valve control means in one direction in response to low pressure compressor discharge pressure, and means operable to provide a control pressure connected to the valve control means so that the control pressure biases the valve control means in the other direction; the control pressure providing means including means connected to the high pressure compressor outlet conducting air at high pressure compressor discharge pressure to the control pressure providing means and means operable to reduce the air so conducted to a lower value of pressure determined at least in part by high pressure compressor discharge pressure; movement of the bleed valve control means in the said one direction being effective to open the air bleed and movement thereof in the other direction being effective to close the air bleed.

8. A bleed control as recited in claim 7 including also pressure responsive means connected to the valve control means urging the valve control means in the said one direction and means connecting the said urging means to the high pressure compressor outlet and supplying high pressure compressor discharge pressure to the said urging means.

9. A bleed control as recited in claim 7 in which the means for conducting air from the high pressure compressor outlet to the control pressure providing means includes a valve and means operable to close said valve in response to a condition indicative of operation of the engine below a predetermined power level.

10. A bleed control as recited in claim 7 in which the means for conducting air from the high pressure compressor outlet to the control pressure providing means includes a valve and means operable to close said valve in response to a condition indicative of acceleration of the engine.

11. A bleed control as recited in claim 7 in which the means for conducting air from the high pressure compressor outlet to the control pressure providing means includes means for closing said conducting means in response to a condition indicative of operation of the engine below a predetermined power level and means for closing said conducting means in response to a condition indicative of acceleration of the engine.

12. A bleed control as recited in claim 7 in which the said air pressure reducing means includes automatic means responsive to low pressure compressor inlet temperature and low pressure compressor speed for varying the control pressure.

13. A bleed control for a gas turbine engine of the type comprising a low pressure compressor, a high pressure compressor, air flow conducting means connecting the outlet of the low pressure compressor to the inlet of the high pressure compressor, an air bleed in communication with said means, and valve means in the air bleed operable to open and close the air bleed; the bleed control comprising, in combination, bleed valve control means connected to and operating the said valve means, the said bleed valve control means being movable and moving to control the valve means, means connected to the low pressure compressor outlet and the bleed valve control means biasing the bleed valve control means in one direction in response to low pressure compressor discharge pressure, and means operable to provide a control pressure connected to the valve control means so that the control pressure biases the valve control means in the other direction; the control pressure providing means including means connected to the high pressure compressor outlet conducting air at high pressure compressor discharge pressure to the control pressure providing means and means including series-connected throttling valves operable to reduce the air so conducted to a lower value of pressure between the throttling valves determined at least in part by high pressure compressor discharge pressure, the pressure between the throttling valves being the control pressure, movement of the bleed valve control means in the said one direction being effective to open the air bleed and movement thereof in the other direction being effective to close the air bleed.

14. A bleed control as recited in claim 13 in which the area of one of said series-connected throttling valves is variable and including automatic means responsive to low pressure compressor speed for varying the area of said variable throttling valve.

15. A bleed control as recited in claim 13 in which the area of one of said series-connected throttling valves is variable and including automatic means responsive to low pressure compressor inlet temperature and low pressure compressor speed for varying the area of said variable throttling valve.

16. A bleed control as recited in claim 13 including also pressure responsive means connected to the bleed valve control means urging the bleed valve control means in the said one direction and means connecting the said urging means to the high pressure compressor outlet and supplying high pressure compressor discharge pressure to the said urging means.

17. A bleed control as recited in claim 13 in which the means for conducting air from the high pressure compressor outlet to the control pressure providing means includes means for closing said conducting means in response to a condition indicative of operation of the engine below a predetermined power level.

18. A bleed control as recited in claim 13 in which the means for conducting air from the high pressure compressor outlet to the control pressure providing means includes means for closing said conducting means in response to a condition indicative of acceleration of the engine.

19. A bleed control for a gas turbine engine of the type comprising a low pressure compressor, a high pressure compressor, air flow conducting means connecting the outlet of the low pressure compressor to the inlet of the high pressure compressor, an air bleed in communication with said means, and valve means in the air bleed operable to open and close the air bleed; the bleed control comprising, in combination, bleed valve control means connected to and operating the said valve means, the said bleed valve control means being movable and moving to control the valve means, means connected to the low pressure compressor outlet and the bleed valve control means biasing the bleed valve control means in one direction in response to low pressure compressor discharge pressure, and means operable to provide a control pressure connected to the bleed valve control means so that the control pressure biases the bleed valve control means in the other direction; the control pressure providing means including first means connected to the low pressure compressor responsive to low pressure compressor speed, second means connected to the low pressure compressor inlet responsive to low pressure compressor inlet temperature, and means connected to the high pressure compressor outlet communicating air at high pressure compressor discharge pressure to the control pressure providing means, means operative to reduce high pressure compressor outlet pressure air in pressure variably to provide the control pressure, the last-named means being connected to and actuated by the said first and second means so that the control pressure is modified as a function of low pressure compressor speed and inlet temperature; movement of the bleed valve control means in the said one direction being effective to open the air bleed and movement thereof in the other direction being effective to close the air bleed.

20. A bleed control as recited in claim 19 including also pressure responsive means connected to the bleed valve control means urging the bleed valve control means in the said one direction and means connecting the said urging means to the high pressure compressor outlet and supplying high pressure compressor discharge pressure to the said urging means.

21. A bleed control as recited in claim 20 in which the means for conducting air from the high pressure compressor outlet to the control pressure providing means includes means for closing said conducting means in response to a condition indicative of operation of the engine below a predetermined power level and means for closing said conducting means in response to a condition indicative of acceleration of the engine.

References Cited in the file of this patent
UNITED STATES PATENTS

| | | |
|---|---|---|
| 1,111,498 | Rotter | Sept. 22, 1914 |
| 2,405,413 | Edwards | Aug. 6, 1946 |
| 2,559,623 | Holmes | July 10, 1951 |
| 2,667,150 | Coar | Jan. 26, 1954 |
| 2,781,634 | Moore | Feb. 19, 1957 |
| 2,785,848 | Lombard et al. | Mar. 19, 1957 |
| 2,837,269 | Torell | June 3, 1958 |